Patented Dec. 14, 1937

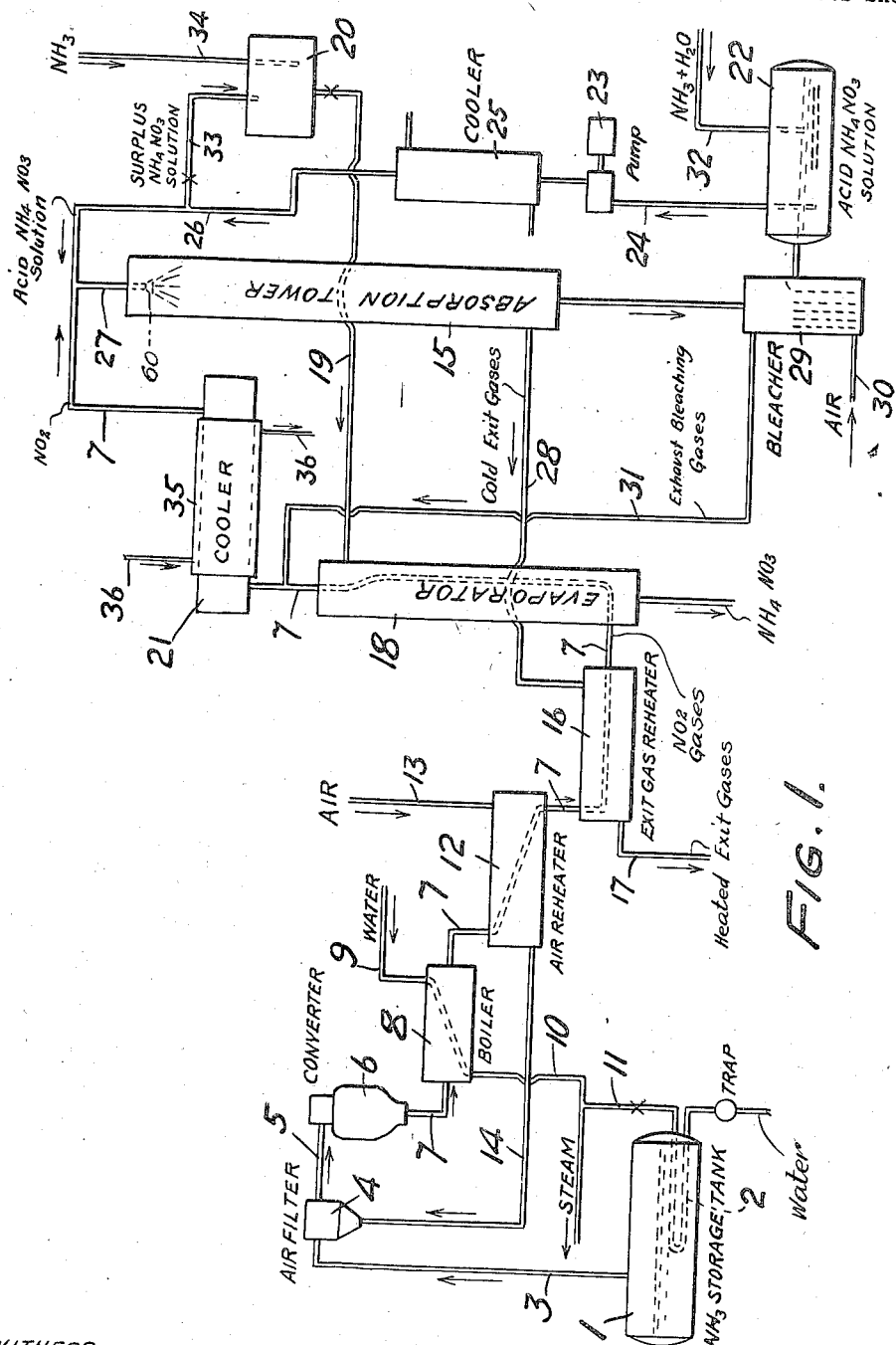

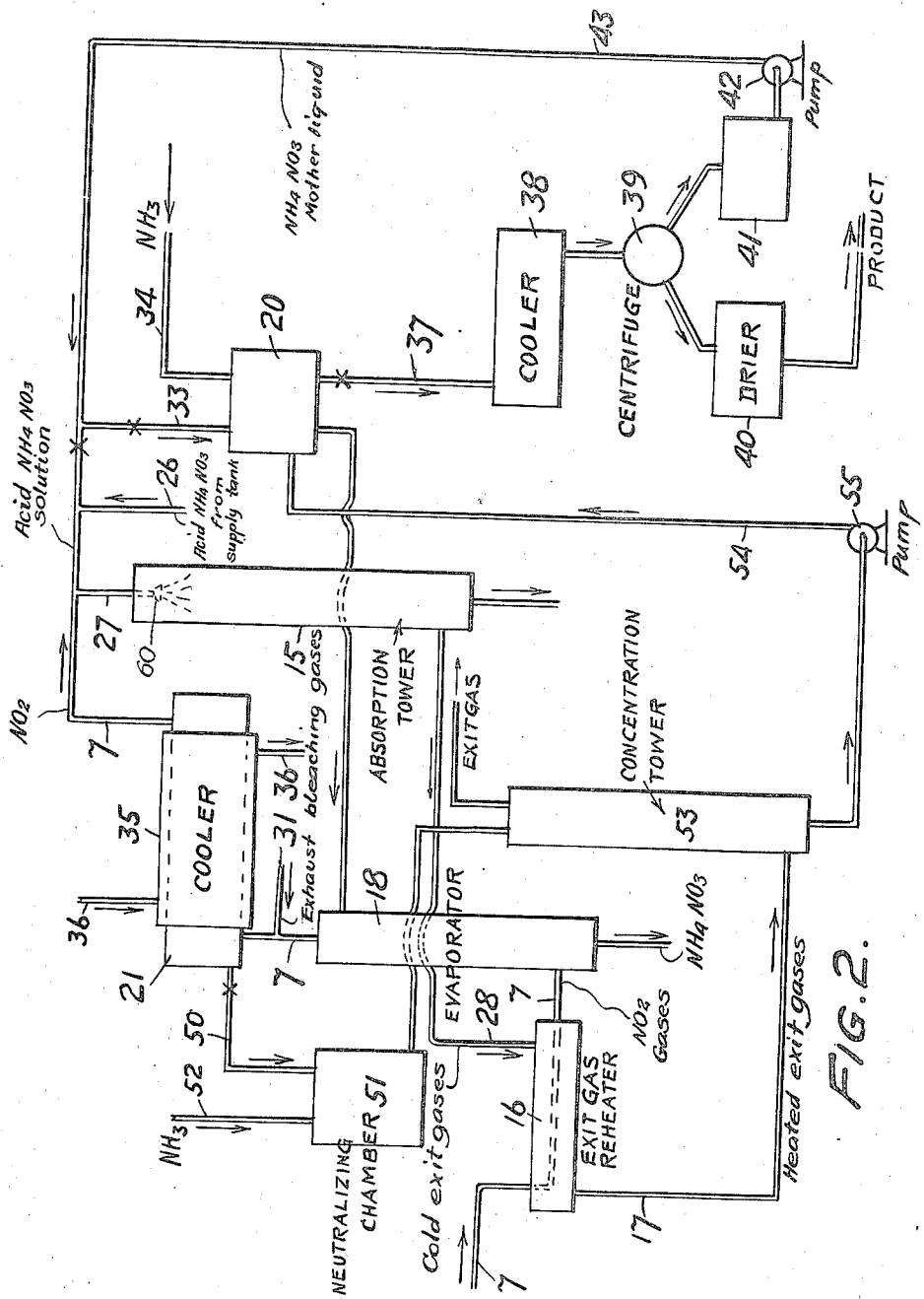

2,102,136

UNITED STATES PATENT OFFICE 2,102,136

PROCESS AND APPARATUS FOR MANUFACTURING AMMONIUM NITRATE

James H. Shapleigh, Wilmington, Del., assignor to Hercules Powder Company, Wilmington, Del., a corporation of Delaware Application January 18, 1935, Serial No. 2,350

20 Claims. (Cl. 23—103)

This invention relates to the manufacture of inorganic nitrates and more specifically, to a method and apparatus for the absorption of a mixture of nitrogen oxide and oxygen in an aqueous solution of an inorganic nitrate, followed by neutralization of the nitric acid formed.

This invention is applicable to the production of inorganic nitrates, as nitrates of ammonia, sodium, potassium, calcium, etc., but for illustrative purposes will be described in detail with reference to the production of ammonium nitrate.

In conventional manufacture of ammonium nitrate heretofore, nitric acid, produced by, for example, the ammonia oxidation process and of a concentration of about 35–45% $HNO_3$, was placed in an acidproof tub, and below the surface thereof a stream of aqua ammonia, or of gaseous ammonia was run in. As neutralization proceeded, more and more nitric acid was run into the tub in order to keep the contents on the acid side and to prevent loss of ammonia as gas. At the end of the operation, the contents of the tub were brought to neutrality, removed to an evaporator, where the water was removed from the solution by steam coils, and the molten ammonium nitrate was run out into crystallizing pans or kettles.

It will be noted that in this operation it was first necessary to produce aqueous nitric acid, cool it, thus wasting heat, and, after neutralization, again expend energy, as heat, to remove the superfluous water.

Now in accordance with this invention an improved method and apparatus for producing ammonium nitrate are provided, which overcome many of the difficulties of prior processes and apparatus in an efficient and economical manner.

One of the objects of this invention is to produce crystallized ammonium nitrate from ammonia and air or oxygen, with evaporation only of the water produced in the oxidation of said ammonia.

Essentially, the improved process according to this invention involves passing nitrogen oxides into a flow of nitrate of ammonia solution as it passes down an absorption tower, whereby the nitrogen oxides are absorbed to form nitric acid. To the aqueous acid solution of nitrate of ammonia solution is added aqueous or anhydrous ammonia, which immediately, by reaction with the nitric acid in the solution, is converted into nitrate of ammonia, and, after removing heat of reaction from the solution, the solution is returned to the top of the absorption tower, where it again goes through the same cycle.

As the quantity of ammonium nitrate solution circulating through the system increases in bulk, a proportion of it is periodically drawn off and, after neutralization of the slight excess of nitric acid therein by addition of aqueous or anhydrous ammonia, sent to storage, or where aqueous ammonia was used for forming the ammonium nitrate, direct to evaporators wherein the water contained in the solution is driven off and the ammonium nitrate crystallized.

In other words, in accordance with this invention, a method and apparatus is produced whereby nitric acid manufacture with neutralization for the formation of an inorganic nitrate is combined. Acidified inorganic nitrate solution is circulated through a tower, through which nitrogen oxide gases and oxygen are passed. The water heretofore necessary for showering the tower to form nitric acid from said gases is supplied by the water of the inorganic nitrate solution and the nitric acid formed in the solution is neutralized to an inorganic nitrate.

Having now indicated in a general way the nature of the method and apparatus in accordance with this invention, I will proceed to a detailed description thereof with reference to the accompanying drawings in which:

Figure 1 is a diagrammatic showing of a form of apparatus for carrying out the method of this invention.

Figure 2 is a diagrammatic showing of a modified form of apparatus.

With reference to the drawings in which there is diagrammatically illustrated a form of apparatus embodying this invention adapted for carrying out the method of this invention and in connection with a description of which procedure involving the method will become apparent, a supply of ammonia, preferably anhydrous ammonia, is contained in a storage tank 1. Ammonia in the tank 1 is vaporized by means of heat supplied by, for example, a steam coil 2. Ammonia vapor passes from the tank 1 through a conduit 3 to an air filter 4, from which, in admixture with air, the ammonia vapor passes through a conduit 5 into a converter 6. The converter may be of the type commonly used in ammonia oxidation by means of a catalyst, as, for example, platinum.

In the converter 6 the ammonia is oxidized to nitrogen oxide. The oxidation of the ammonia in the converter is initially started by the application of heat and thereafter continued under the influence of heat of reaction.

The hot nitrogen oxide gases pass from the converter 6 through a conduit 7. The conduit 7 passes in heat interchange relation with a boiler 8 supplied with water through a conduit 9. In the boiler 8 steam is formed and passes through a conduit 10 to any desired point of use. A portion of the steam passes through a valved conduit 11 to the coil 2 in the ammonia storage tank 1.

The conduit 7, carrying the hot nitrogen oxide gases from the converter 6 beyond the boiler, passes into heat interchange relation with an air heater 12, supplied with air from any suitable source through a conduit 13. The air heated in the heater 12 passes through a conduit 14 to the air filter 4, in which it is admixed with the ammonia vapor passing to the converter 6.

Beyond the air heater the conduit 7 passes in heat interchange relation with exit gases from an absorption tower 15 in a heater 16. The exit gases from the absorption tower pass to the heater 16 through a conduit 28. The heated exit gases pass through a conduit 17 for such use as it may be desired to put them to, as for example, for use in driving an air compressor for the supply of air under pressure to the conduit 13. The hot nitrogen oxide gases carried by conduit 7 beyond the exit gas heater 16, pass through an evaporator 18 in heat interchange relation with aqueous ammonium nitrate solution passing to the evaporator through a conduit 19 leading from a receiver 20.

The nitrogen oxide gases carried by the conduit 7 beyond the evaporator 18, pass through a cooler 21 and from thence to the absorption tower 15. The cooler 21 is provided with a water jacket 35 having inlet and outlet pipes 36 for water.

A supply of an aqueous solution of ammonium nitrate is provided in tank 22. The solution in tank 22 is acid.

From the tank 22 aqueous acid ammonium nitrate solution is drawn by a pump 23 through a conduit 24 and is forced by the pump through a cooler 25 and a conduit 26 to the absorption tower 15.

It will be noted that the conduit 26 joins the conduit 7 and that the acid ammonium nitrate solution and the nitrogen oxide gases are passed into the absorption tower together through a conduit 27 terminating at the top of the tower in a spray head 60. The absorption tower is of any usual and well known construction and may be provided with any suitable form of packing.

In the absorption tower the nitrogen oxide gases are absorbed by the water of the ammonium nitrate solution with the formation of nitric acid.

As has been described, the exit gases from the lower end of the absorption tower pass through conduit 28 in heat interchange relation with the hot nitrogen oxide gases in heater 16, from whence they pass for use as a source of power.

The ammonium nitrate solution with nitric acid absorbed in its passage through the absorption tower, passes from the bottom of the absorption tower through a bleacher 29, in which nitrogen oxides are removed from the solution by means of air entering the bleacher from any suitable source of supply through a conduit 30 and passing from the bleacher with nitrogen oxides removed from the solution through a conduit 31 to the conduit 7 carrying the nitrogen oxide gases to the absorption tower 15.

From the bleacher 29 the ammonium nitrate solution carrying nitric acid passes into the tank 22. Aqueous or anhydrous ammonia is introduced into the tank 22 through a conduit 32. The ammonia introduced into the tank 22 reacts with the nitric acid contained by the solution entering the tank 22 from the bleacher 29 with the formation of ammonium nitrate.

From the conduit 26, through which acid ammonium nitrate solution from the tank 22 passes to the absorption tower 15, a proportion of the ammonium nitrate solution is drawn into the receiver 20 through a valved conduit 33.

The amount of ammonium nitrate solution drawn periodically or continuously into the receiver 20 depends upon the formation of ammonium nitrate in the tank 22 by reaction of ammonia, introduced into the tank 22, with nitric acid in the ammonium nitrate solution passing from the bleacher 29 into the tank 22.

The acid ammonium nitrate solution drawn into receiver 20 is neutralized in the receiver 20 by the addition of aqueous or anhydrous ammonia into the receiver from any suitable source through a conduit 34.

From the receiver 20, as has been indicated above, ammonium nitrate solution is periodically or continuously drawn through the conduit 19, which is provided with a suitable valve, into the evaporator 18, in which the water of the solution is completely or partially evaporated by heat from the hot nitrogen oxide gases passing through conduit 7 in heat interchange relation with the evaporator. Where the heat of the nitrogen oxide gases is sufficient to evaporate the ammonium nitrate solution in the evaporator, crystalline ammonium nitrate will be recovered from the evaporator. Should the nitrogen oxide gases in conduit 7 supply insufficient heat to the evaporator to completely evaporate the ammonium nitrate solution, partial evaporation will be accomplished and finally complete evaporation effected in a supplemental evaporator of any suitable structure and supplied with heat from any suitable source.

In carrying out the method in accordance with this invention as described above, it is preferable, though not essential, to operate under pressure. Any suitable pressure may be used, but generally speaking a pressure within about the range 4–10 atmospheres will be found efficient.

As has been indicated for the formation of ammonium nitrate by the addition of ammonia, to the ammonium nitrate solution containing absorbed nitric acid, as in tank 22, and for final neutralization, as in receiver 20, either aqueous or anhydrous ammonia may be used. Where aqueous ammonia is used the ammonium nitrate is recovered by evaporation of the water from the solution. On the other hand, where anhydrous ammonia is used, it follows that there is no addition of water to the system, hence, where the system is placed in operation with an initial amount of aqueous solution, if the concentration of ammonium nitrate in the solution is allowed to build up to say about 80%, the ammonium nitrate may be crystallized out of the solution by cooling and without evaporation of water. In such case the mother liquor is returned to the absorption portion of the cycle.

Referring now more particularly to Figure 2, in which the similar parts of the apparatus shown in Figure 1 are indicated by similar symbols, a part of the ammonium nitrate solution in receiver 20 may be periodically or continuously withdrawn, through a valved conduit 37, to a cooler 38, in which a portion of the ammonium nitrate will be precipitated, and from thence to a centrifugal separator 39, in which the precipitated ammonium nitrate will be separated from the solution. The precipitated ammonium nitrate in the form of crystals will be removed from the centrifugal to a drier 40 and from thence to storage. The solution or liquor will pass from the centrifugal to a receiver 41 and from there will be released, through conduit 43 by means of a pump 42, to the absorption tower 15 or to the receiver 20.

Also, in the arrangement shown in Figure 2, the interior of the cooler 21 is connected through a valved conduit 50 with a receiver 51 into which acid condensate from the cooler 21 may be drawn. Condensate drawn into receiver 51 is neutralized by means of ammonia introduced into the receiver through conduit 52 and the neutralized condensate is then passed downwardly through an evaporating tower 53 supplied with reheated exit gases from the gas reheater 16. The concentrated liquor from evaporator 53 passes through conduit 54 under the influence of a pump 55 to the receiver 20.

It will be appreciated that the apparatus and method embodying this invention as above described with reference to the production of ammonium nitrate are adaptable for the production of other inorganic nitrates, as, for example, sodium nitrate, potassium nitrate, calcium nitrate, and the like. Thus, for the production of inorganic nitrates other than ammonium nitrate, it is only necessary to substitute for the aqueous solution of ammonia supplied to tank 22, and which is used for the production of nitric acid by absorption of nitrogen oxide gases in the absorption tower 15, an aqueous solution of, an alkali as, for example, a hydroxide or carbonate of sodium, potassium, calcium, etc. and to effect neutralization in receiver 20 of the acid salt solution drawn from the conduit 26 with a hydroxide or carbonate of sodium, potassium, calcium, etc.

It will now be observed that in accordance with this invention a method and apparatus for the production of an inorganic nitrate are provided, by virtue of which an inorganic nitrate is produced with great efficiency and economy as compared with prior processes, which involved the independent production and concentration of nitric acid and of inorganic nitrate therefrom. In the apparatus and method in accordance with this invention, great saving is effected by virtue of the efficient use of the original heat, heretofore largely wasted, of the nitrogen oxide gases, not only for the production of power, but also in connection with the evaporation of the inorganic nitrate solution produced.

It will be understood that the expression "nitrogen oxide gases", and the like, as used in the foregoing description, refer to the gas mixture produced as the result of oxidation of ammonia with oxygen or air in the catalytic converter, and which comprises essentially nitric oxide, oxygen, and other nitric oxides, such as nitrogen dioxide, the several nitric oxides being present in varying amounts throughout the system depending on the temperature and pressure conditions obtaining at various points therein.

What I claim and desire to protect by Letters Patent is:

1. The process of manufacturing an inorganic nitrate including catalytically oxidizing ammonia with air to form a mixture of nitric oxide and oxygen, cooling said mixture, effecting absorption of nitric oxides in a recirculating solution of the inorganic nitrate, and adding an alkali corresponding to the inorganic nitrate to the solution between the absorption passes thereof to react with nitric acid formed therein, the recirculating solution being maintained acid.

2. The process of manufacturing an inorganic nitrate including catalytically oxidizing ammonia with oxygen to form a mixture of nitric oxide and oxygen, cooling said mixture, effecting absorption of nitric oxides in a recirculating solution of the inorganic nitrate, and adding an alkali corresponding to the inorganic nitrate to the solution between the absorption passes thereof to react with nitric acid formed therein, the recirculating solution being maintained acid.

3. The process of manufacturing ammonium nitrate from ammonia including catalytically oxidizing ammonia with oxygen to form a mixture of nitric oxide and oxygen, cooling said mixture, effecting absorption of nitric oxides in a recirculating ammonium nitrate solution, and adding ammonia to the solution between the absorption passes thereof to react with nitric acid formed therein, the recirculating solution being maintained acid.

4. The process of manufacturing ammonium nitrate from ammonia including catalytically oxidizing ammonia with air to form a mixture of nitric oxide and oxygen, effecting absorption of nitric oxides in a recirculating ammonium nitrate solution, and adding ammonia to the solution between the absorption passes thereof to react with nitric acid formed therein, the recirculating solution being maintained acid.

5. The process of manufacturing ammonium nitrate from ammonia including catalytically oxidizing ammonia with air to form a mixture of nitric oxide and oxygen, effecting absorption of nitric oxides in a recirculating ammonium nitrate solution, and adding anhydrous ammonia to the solution between the absorption passes thereof to react with nitric acid formed therein, the recirculating solution being maintained acid.

6. The process of manufacturing ammonium nitrate from ammonia including catalytically oxidizing ammonia with air to form a mixture of nitric oxide and oxygen, effecting absorption of nitric oxides in a recirculating ammonium nitrate solution, adding ammonia to the solution between the absorption passes thereof to react with nitric acid formed therein, the recirculating solution being maintained acid, and withdrawing ammonium nitrate solution from the recirculating solution.

7. The process of manufacturing ammonium nitrate from ammonia including catalytically oxidizing ammonia with air to form a mixture of nitric oxide and oxygen, effecting absorption of nitric oxides in a recirculating ammonium nitrate solution, adding ammonia to the solution between the absorpton passes thereof to react with nitric acid formed therein, the recirculating solution being maintained acid, and continuously withdrawing ammonium nitrate solution from the recirculating solution.

8. The process of manufacturing ammonium nitrate from ammonia including catalytically oxidizing ammonia with air to form a mixture of nitric oxide and oxygen, effecting absorption of nitric oxides in a recirculating ammonium nitrate solution, and adding ammonia to the solution between the absorption passes thereof to react with the nitric acid formed therein, the recirculating solution being maintained acid.

9. The process of manufacturing an inorganic nitrate including recirculating a solution of the inorganic nitrate, absorbing nitric oxides in such solution and adding alkali corresponding to the inorganic nitrate to the solution between the absorption passes thereof to react with the nitric acid formed therein, the recirculation solution being maintained acid.

10. The process of manufacturing ammonium nitrate including recirculating a solution of ammonium nitrate, absorbing nitric oxides in such solution, adding ammonia to the solution between the absorption passes thereof to react with the nitric acid formed therein, the recirculation solution being maintained acid, and withdrawing ammonium nitrate solution from the recirculating solution.

11. The process of manufacturing ammonium nitrate including recirculating a solution of ammonium nitrate, absorbing nitric oxides in such solution, adding ammonia to the solution between the absorption passes thereof to react with the nitric acid formed therein, the recirculation solution being maintained acid, and continuously withdrawing ammonium nitrate solution from the recirculating solution.

12. The process of manufacturing ammonium nitrate including recirculating a solution of ammonium nitrate, absorbing nitric oxides in such solution, and adding ammonia to the solution between the absorption passes thereof to react with the nitric acid formed therein, the recirculating solution being maintained acid.

13. The process of manufacturing ammonium nitrate including recirculating a solution of ammonium nitrate, absorbing nitric oxides in such solution, adding ammonia to the recirculating solution between the absorption passes thereof to react with the nitric acid formed therein, the recirculating solution being maintained acid, withdrawing ammonium nitrate solution from the recirculating solution, and neutralizing the withdrawn solution with ammonia.

14. The process of manufacturing an inorganic nitrate including absorbing nitric oxides in an inorganic nitrate solution maintained acid during the absorption step, adding an alkali corresponding to the inorganic nitrate to the solution after the absorption step to react with the nitric acid formed therein, cooling the solution for precipitation of the inorganic nitrate, separating precipitated inorganic nitrate from the solution and absorbing nitric oxides in the separated solutions.

15. The process of manufacturing an inorganic nitrate including absorbing nitric oxides in an inorganic nitrate solution maintained acid during the absorption step, removing unabsorbed nitric oxides from said solution, adding an alkali corresponding to the inorganic nitrate to the solution after the removal of unabsorbed nitric oxides to react with the nitric acid formed therein, and evaporating the solution for recovery of the inorganic nitrate.

16. The process of manufacturing ammonium nitrate including absorbing nitric oxides in a solution of ammonium nitrate maintained acid during the absorption step, removing unabsorbed nitric oxides from said solution, adding ammonia to the solution after removal of unabsorbed nitric oxides to react with the nitric acid formed therein, and evaporating the solution for recovery of ammonium nitrate.

17. The process of manufacturing ammonium nitrate including recirculating a solution of ammonium nitrate, absorbing nitric oxides in such solution, removing unabsorbed nitric oxides from the recirculating solution, adding ammonia to said solution after removal of unabsorbed nitric oxides to react with the nitric acid formed therein, the recirculation solution being maintained acid, withdrawing a portion of the recirculating solution, neutralizing the withdrawn solution with ammonia, and evaporating the neutralized solution for recovery of ammonium nitrate.

18. The process of manufacturing ammonium nitrate including catalytically oxidizing ammonia with oxygen to form a mixture of nitric oxide and oxygen, recirculating an acid solution of ammonium nitrate, absorbing nitric oxides in such solution, removing unabsorbed nitric oxides from the recirculating solution, adding ammonia to said solution after removal of unabsorbed nitric oxides to react with the nitric acid formed therein, withdrawing a portion of the recirculating solution, neutralizing the withdrawn solution with ammonia, and evaporating the neutralized solution by passing it in heat exchange relation with the hot nitric oxides produced by said catalytic oxidation of ammonia for recovery of the ammonium nitrate therefrom.

19. The process of manufacturing ammonium nitrate from ammonia including catalytically oxidizing ammonia with air to form a mixture of nitric oxide and oxygen, effecting absorption of nitric oxides in a recirculating ammonium nitrate solution, adding ammonia to the solution between the absorption passes thereof to react with nitric acid formed therein, withdrawing ammonium nitrate solution from the recirculating solution, and evaporating said solution by passing it in heat exchange relation with the hot nitric oxides produced by said catalytic oxidation of ammonia for recovery of the ammonium nitrate therefrom.

20. The process of manufacturing ammonium nitrate including absorbing nitric oxides in an ammonium nitrate solution maintained acid during the absorption step, adding ammonia to the solution after the absorption step to react with the nitric acid formed therein, cooling the solution for precipitation of ammonium nitrate, separating precipitated ammonium nitrate from the solution and absorbing nitric oxides in the separated solutions.

JAMES H. SHAPLEIGH.

CERTIFICATE OF CORRECTION.

Patent No. 2,102,136.                                               December 14, 1937.

JAMES H. SHAPLEIGH.

It is hereby certified that error appears in the printed specification of the above numbered patent requiring correction as follows: Page 3, second column, line 61, claim 7, for "absorpton" read absorption; page 4, first column, lines 13 and 22-23, and second column, line 17, claims 10, 11 and 17, for "recirculation" read recirculating; and that the said Letters Patent should be read with these corrections therein that the same may conform to the record of the case in the Patent Office.

Signed and sealed this 8th day of February, A. D. 1938.

(Seal)                                                        Henry Van Arsdale,
Acting Commissioner of Patents.